(12) United States Patent
Yeo

(10) Patent No.: US 10,247,953 B2
(45) Date of Patent: Apr. 2, 2019

(54) CAMERA MODULE

(71) Applicant: LG INNOTEK CO., LTD., Seoul (KR)

(72) Inventor: In Jae Yeo, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 622 days.

(21) Appl. No.: 14/951,065

(22) Filed: Nov. 24, 2015

(65) Prior Publication Data

US 2016/0085087 A1 Mar. 24, 2016

Related U.S. Application Data

(63) Continuation of application No. 14/413,723, filed as application No. PCT/KR2013/005915 on Jul. 3, 2013, now Pat. No. 9,225,886.

(30) Foreign Application Priority Data

Jul. 9, 2012 (KR) .................. 10-2012-0074378
Jul. 20, 2012 (KR) .................. 10-2012-0079578

(51) Int. Cl.
*G02B 27/64* (2006.01)
*G03B 5/00* (2006.01)
(Continued)

(52) U.S. Cl.
CPC ........... *G02B 27/646* (2013.01); *G02B 5/208* (2013.01); *G02B 7/09* (2013.01); *G02B 13/0015* (2013.01); *G03B 3/10* (2013.01); *G03B 5/00* (2013.01); *G03B 17/12* (2013.01); *H04N 5/2252* (2013.01); *H04N 5/2254* (2013.01);
(Continued)

(58) Field of Classification Search
CPC .......... G02B 7/00; G02B 7/004; G02B 7/005; G02B 7/008; G02B 7/02; G02B 7/023; G02B 7/04
USPC ...... 359/808, 811, 813, 814, 819 M, 822 M, 359/823 M, 824 M, 819, 822, 823, 824
See application file for complete search history.

(56) References Cited

U.S. PATENT DOCUMENTS 7,845,867 B2  12/2010  Huang et al.
8,238,734 B2  8/2012  Chiang
(Continued)

FOREIGN PATENT DOCUMENTS

CN  101135763  3/2008
CN  101387730  3/2009
(Continued)

OTHER PUBLICATIONS

U.S. Pat. No. 9,225,886, dated Dec. 29, 2015, U.S. Appl. No. 14/413,723, filed Jan. 9, 2015.
(Continued)

*Primary Examiner* — Robert E. Tallman
(74) *Attorney, Agent, or Firm* — KED & Associates, LLP

(57) ABSTRACT

A camera module according to the embodiment includes a housing; a lens barrel disposed in the housing to receive a lens; and an elastic member connecting the housing to the lens barrel, and comprising a first elastic part and a second elastic part bent from the first elastic part to have a height from a plane perpendicular to an optical axis of the lens, which is different from a height of the first elastic part. Therefore, the camera module may automatically correct a shake and may adjust a focus.

19 Claims, 12 Drawing Sheets

(51) Int. Cl.
  *G03B 3/10* (2006.01)
  *G03B 17/12* (2006.01)
  *G02B 13/00* (2006.01)
  *H04N 5/225* (2006.01)
  *H04N 5/232* (2006.01)
  *G02B 5/20* (2006.01)
  *G02B 7/09* (2006.01)
  *H04N 5/372* (2011.01)
  *H04N 5/374* (2011.01)

(52) U.S. Cl.
  CPC .......... *H04N 5/2328* (2013.01); *H04N 5/372* (2013.01); *H04N 5/374* (2013.01); *G03B 2205/0007* (2013.01); *G03B 2205/0015* (2013.01); *G03B 2205/0046* (2013.01); *G03B 2205/0053* (2013.01); *G03B 2205/0069* (2013.01)

(56) References Cited

U.S. PATENT DOCUMENTS

| | | | |
|---|---|---|---|
| 8,259,218 B2 | 9/2012 | Huang et al. | |
| 8,314,841 B2* | 11/2012 | Chiu | G03B 5/00 348/208.11 |
| 8,860,828 B2 | 10/2014 | Wade et al. | |
| 2004/0207745 A1 | 10/2004 | Tsuruta et al. | |
| 2005/0048829 A1 | 3/2005 | Nishio et al. | |
| 2009/0073585 A1 | 3/2009 | Yamashita | |
| 2009/0303380 A1* | 12/2009 | Seo | H04N 5/2253 348/373 |
| 2009/0322930 A1 | 12/2009 | Chang et al. | |
| 2010/0110270 A1 | 5/2010 | Sekimoto et al. | |
| 2011/0205647 A1* | 8/2011 | Osaka | F16F 1/021 359/824 |
| 2011/0236008 A1 | 9/2011 | Kang et al. | |
| 2011/0262122 A1 | 10/2011 | Minamisawa et al. | |
| 2012/0154614 A1 | 6/2012 | Moriya et al. | |
| 2014/0355120 A1 | 12/2014 | Yeo | |

FOREIGN PATENT DOCUMENTS

| | | |
|---|---|---|
| JP | 2005-073130 A | 3/2005 |
| JP | 2011-085666 A | 4/2011 |
| KR | 10-2006-0130857 A | 12/2006 |
| KR | 10-2009-0131925 A | 12/2009 |
| KR | 10-2010-0048361 A | 5/2010 |
| WO | WO 2010/044222 | 4/2010 |
| WO | WO 2011/021559 A1 | 2/2011 |

OTHER PUBLICATIONS

International Search Report dated Oct. 15, 2013 issued in Application No. PCT/KR2013/005915 (full English text).
United States Notice of Allowance dated Aug. 18, 2015 issued in U.S. Appl. No. 14/413,723.
European Search Report dated Mar. 2, 2016 issued in Application No. 13817286.1.
Chinese Office Action dated Feb. 6, 2017 issued in Application No. 201380036472.6 (with English translation).

* cited by examiner (a)

(b)

(a)

(b)

CAMERA MODULE

CROSS-REFERENCE TO RELATED APPLICATIONS

This application is a Continuation application of prior U.S. patent application Ser. No. 14/413,723 filed Jan. 9, 2015, is a U.S. National Stage application under 35 U.S.C. § 371 of PCT Application No. PCT/KR2013/005915, filed Jul. 3, 2013, which claims priority to Korean Patent Application Nos. 10-2012-0074378, filed Jul. 9, 2012 and 10-2012-0079578 filed Jul. 20, 2012, whose entire disclosures are hereby incorporated by reference.

BACKGROUND

1. Field

The embodiment relates to a camera module.

2. Background

In general, a camera module is mounted on a vehicle, an endoscope or an IT (Information Technology) appliance such as a mobile communication terminal or a laptop computer. Such a camera module is developed to have hundreds of thousands or millions of pixels. In addition, various studies and researches have been performed to miniaturize the camera module and to add various functions such as an AF (Auto Focusing) or an optical zoom to the camera module at a low cost.

DISCLOSURE OF INVENTION

Technical Problem

Therefore, the embodiment is provided to miniaturize a camera module and to add various functions to the camera module. That is, the embodiment is provided to add a shake correction function and an AF control function to a camera module. In addition, the embodiment is provided to miniaturize a camera module.

Solution to Problem

According to the embodiment, there is provided a camera module including a housing; a lens barrel disposed in the housing to receive a lens; and an elastic member connecting the housing to the lens barrel, and comprising a first elastic part and a second elastic part bent from the first elastic part to have a height from a plane perpendicular to an optical axis of the lens, which is different from a height of the first elastic part.

Advantageous Effects of Invention

According to the embodiment, the camera module may automatically correct a shake and may adjust a focus. That is, the driving unit may move the lens barrel corresponding to the housing and the elastic member may provide the restoring force corresponding to the lens barrel, so that the camera module may effectively correct the shake, and at the same time, may adjust the focus. In addition, since the functions of correcting the shake and adjusting the focus through the driving unit and the elastic member are achieved, the miniaturization of the camera module may be implemented. In other words, since various functions may be achieved without adding many components, the miniaturization of the camera module may be implemented.

MODE FOR THE INVENTION

Figure 1:
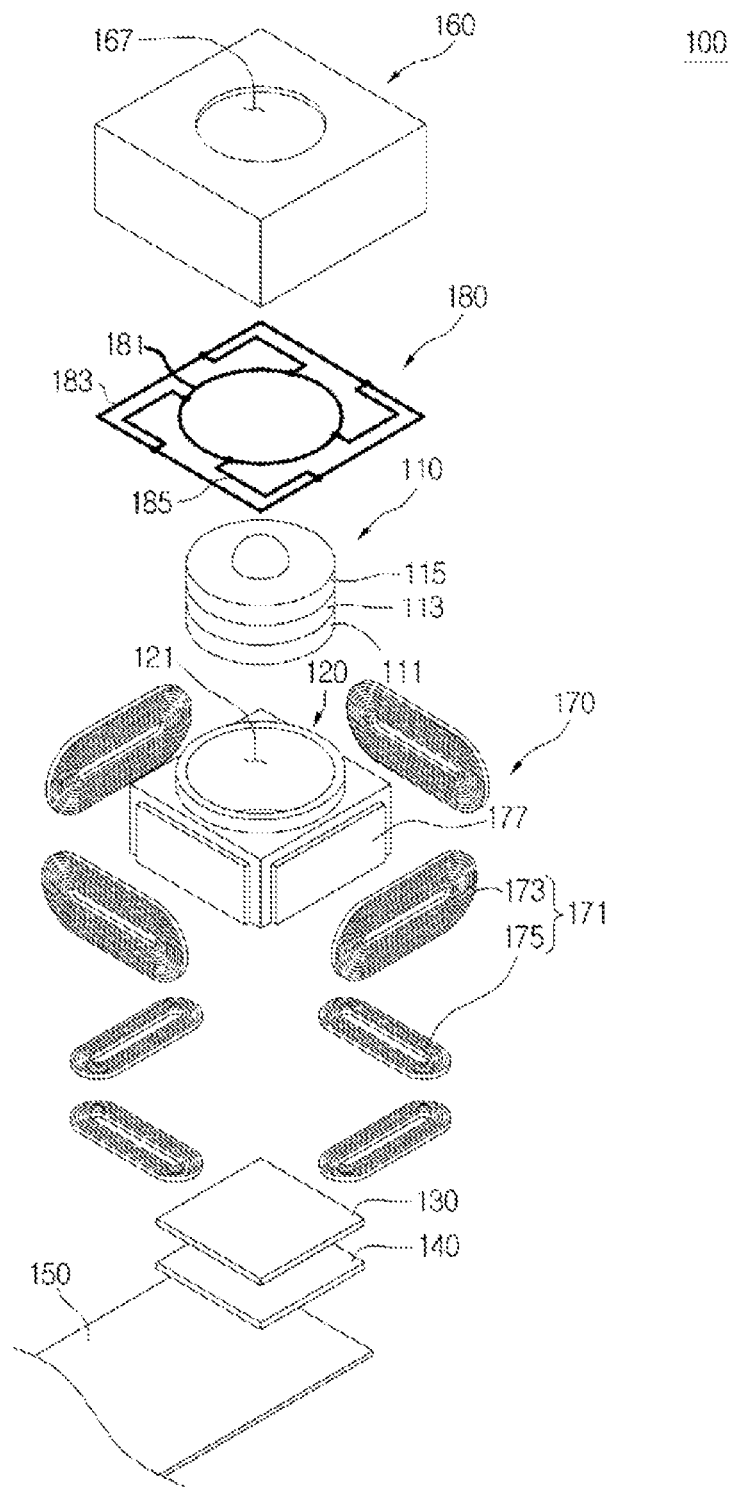
FIG. 1 is an exploded perspective view showing a camera module according to the embodiment.

Hereinafter, the embodiment will be described in more detail with reference to the accompanying drawings. The same reference numerals will be used to refer to the same elements throughout the drawings. In addition, a detailed description of known functions and configurations which make the subject matter of the disclosure unclear will be omitted.

In the description of the embodiments, it will be understood that, when a lens, a unit, a part, a hole, a protrusion, a groove, or a layer is referred to as being "on" or "under" another unit, part, hole, protrusion, groove, or layer, it can be "directly" or "indirectly" on the other unit, part, hole, protrusion, groove, or layer, or one or more intervening elements may also be present. Such a position of an element has been described with reference to the drawings.

FIG. 1 is an exploded perspective view showing a camera module according to the embodiment. Further, FIG. 2 is a sectional view showing a camera module according to the embodiment.

Figure 2:
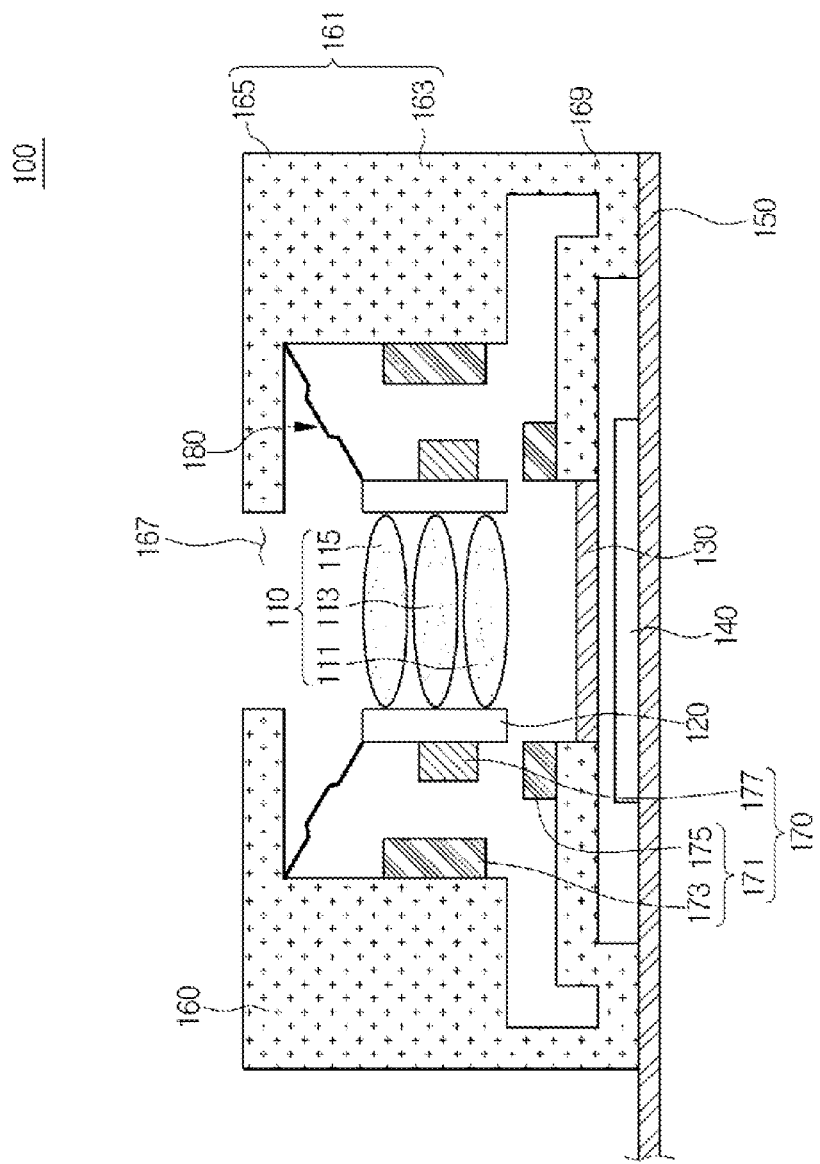
FIG. 2 is a sectional view showing a camera module according to the embodiment.

Referring to FIGS. 1 and 2, the camera module 100 according to the embodiment includes a lens assembly 110, a lens barrel 120, a filter unit 130, a sensor unit 140, a circuit substrate 150, a housing 160, a driving unit 170 and an elastic member 180.

The lens assembly 110 includes at least one lens 111, 113 and 115. When the lens assembly 110 includes a plurality of lenses 111, 113 and 115, the lenses 111, 113 and 115 are sequentially stacked. For example, the lens assembly 110 may include first to third lenses 111 to 115. The second lens 113 may be stacked on the first lens 111, and the third lens 115 may be stacked on the second lens 113. In this case, spacers (not shown) may be interposed between the lenses 111, 113 and 115. The spacers may allow the lenses 111, 113 and 115 to be spaced apart from each other so that gaps may be maintained between the lenses 111, 113 and 115. The lens assembly 110 may have a circular outer shape. Or, the lens assembly 110 may have a rectangular outer shape.

The lens barrel 120 receives the lens assembly 110. That is, the lens barrel 120 has a receiving groove 121 formed therein such that the lens assembly 110 is received in the receiving groove 121. The receiving groove 121 may have a shape corresponding to the lens assembly 110. The receiving groove 121 may have a circular shape. The receiving groove 121 may have a rectangular shape. The lens barrel 120 exposes the lens assembly 110. That is, the lens barrel 120 exposes the lens assembly 110 such that light is incident upon the lens assembly 110.

The filter unit 130 is disposed below the lens barrel 120. The filter unit 130 filters the light incident from the lens assembly 110. In this case, the filter unit 130 may block infrared rays. That is, the filter unit 130 may block the light having a long wavelength. The filter unit 130 may be formed by alternately deposing titanium oxide and silicon oxide on an optical glass. The optical property of the filter unit 130 for blocking infrared rays may be adjusted with the thicknesses of the titanium oxide and the silicon oxide.

The sensor unit 140 is disposed below the filter unit 130. The sensor unit 140 converts the incident light from the filter unit 130 into an electric image signal. The sensor unit 140 includes a CCD (Charge Coupled Device) or a CMOS (Complementary Metal-Oxide Semiconductor).

The circuit substrate 150 is disposed below the sensor unit 140. That is, the sensor unit 140 is mounted on the circuit substrate 150. The circuit substrate 150 is electrically connected to the sensor unit 140. The sensor unit 140 is fixed to the circuit substrate 150. The circuit substrate 150 may include a PCB (Printed Circuit Board).

The housing 160 receives the lens barrel 120, the filter unit 130 and the sensor unit 140. The housing 160 is mounted on the circuit substrate 150. The housing 160 is fixed to the circuit substrate 150. The housing 160 includes first and second housings 161 and 169.

The first housing 161 receives the lens barrel 120. The first housing 161 includes an outer part 163 and a cover part 165. The outer part 163 surrounds the lens barrel 120. The outer part 163 covers an upper portion of the lens barrel 120. A light input groove 167 is formed at the central portion of the cover part 165, so that the lens assembly 110 is exposed through the light input groove 167. That is, the cover part 165 allows the lens assembly 110 to be exposed therethrough such that light is incident upon the lens assembly 110. The first housing 161 may have a rectangular outer shape. Or, the first housing 161 may have a circular outer shape. In addition, the first housing 161 may be formed of plastic or metal.

The second housing 169 receives the filter unit 130 and the sensor unit 140. The second housing 169 is coupled to a lower portion of the first housing 161. The second housing 169 is mounted on the top surface of the circuit substrate 150. The second housing 169 is fixed to the circuit substrate 150. The filter unit 130 may be fixed to the second housing 169. That is, the second housing 169 may allow the filter unit 130 to be disposed between the lens assembly 110 and the sensor unit 140. The second housing 169 may have an outer shape corresponding to that of the first housing 161. The second housing 169 may have a rectangular outer shape. Or, the second housing 169 may have a circular outer shape. In addition, the second housing 169 may be formed of plastic or metal.

The driving unit 170 is fixed to the lens barrel 120 and the housing 160. The driving unit 170 drives the lens barrel 120 with respect to the housing 160. That is, the driving unit 170 moves the lens barrel 120. In other words, the driving unit 170 moves the lens barrel 120 in three-axis directions of up/down, front/rear and left/right directions. In the following description, the left/right direction will be referred to as an X-axis direction, the front/rear direction will be referred to as a Y-axis direction and the up/down direction will be referred to as a Z-axis direction. That is, X-axis and Y-axis are perpendicular to each other in perpendicular to an OA (Optical Axis), and Z-axis corresponds to the OA. The driving unit 170 utilizes a magnetic force. The driving unit 170 includes a first driving unit 171 and a second driving unit 177.

The first driving unit 171 is fixed to the housing 160. The first driving unit 171 may be attached to the inner surface of the housing 160. The first driving unit 171 includes a horizontal driving unit 173 and a vertical driving unit 175. The horizontal driving unit 173 is fixed to the first housing 161. The horizontal driving unit 173 is disposed on a side portion of the lens barrel 120. The horizontal driving unit 173 may be attached to the inner surface of the outer part 163. The horizontal driving unit 173 may apply a magnetic force in the direction perpendicular to the OA, that is, in the front/rear direction or the left/right direction. The vertical driving unit 175 is fixed to the second housing 169. The vertical driving unit 175 is disposed at the lower portion of the lens barrel 120. The vertical driving unit 175 is disposed at an end of the receiving groove 121. The vertical driving unit 175 may apply a magnetic force in the direction parallel with the OA, that is, in the up/down direction.

The first driving unit 171 may include a coil. The horizontal driving unit 173 may be formed by winding the coil about the axis perpendicular to the OA. Further, the vertical driving unit 175 may be formed by winding the coil about the axis parallel with the OA. In addition, the first driving unit 171 may be electrically connected to the circuit substrate 150. The first driving unit 171 may apply a magnetic force at an angle in the range of about 20° to about 70° from the plane perpendicular to the OA.

The second driving unit 177 is fixed to the lens barrel 120. The second driving unit 177 may be attached to an outer surface of the lens barrel 120. The second driving unit faces the first driving unit 171. The second driving unit 177 faces the vertical driving unit 173 in the direction parallel with the OA. The second driving unit 177 faces the horizontal driving unit 175 in the direction perpendicular to the OA. The second driving unit 177 faces the first driving unit 171 while the second driving unit 177 is spaced apart from the first driving unit 171. A gap between the first and second driving units 171 and 177 may be in the range of about 50 μm to about 1000 μm In addition, the second driving unit 177 may have a plate shape. The second driving unit 177 may have a rectangular shape.

The second driving unit 177 may include a magnetic material. The second driving unit 177 may be formed of a magnetic material. The magnetic material includes iron oxide, CoFe2O4, or ferrite. The second driving unit 177 may be electrically connected to the circuit substrate 150. The magnetization direction of the second driving unit 177 may be inclined to the OA. The magnetization direction of the second driving unit 177 may be inclined from the plane perpendicular to the OA. An angle between the magnetization direction of the second driving unit 177 and the plane perpendicular to the OA may be in the range of about −20° to about −70°.

Meanwhile, although it is describe in the embodiment that the first driving unit 171 includes a coil and the second driving unit 177 includes a magnetic material, the embodiment is not limited thereto. That is, even though the first driving unit 171 includes a magnetic material and the second driving unit 177 includes a coil, the embodiment may be implemented.

A repulsive force or an attractive force may be generated between the first and second driving units 171 and 177. That is, the first driving unit 171 may apply the repulsive force or the attractive force to the second driving unit 177. Since the repulsive force and the attractive force have the relative concept, the repulsive force or the attractive force applied from the first driving unit 171 to the second driving unit 177 may be substantially identical to the repulsive force or the attractive force applied from the second driving unit 177 to the first driving unit 171.

The elastic member 180 is disposed in the housing 160. The elastic member 180 connects the lens barrel 120 to the housing 160. The elastic member 180 allows the lens barrel 120 to be move relative to the housing 160. The elastic member 180 is fixed to the lens barrel 120 and the housing 161. The elastic member 180 is fixed to the first housing 161. In addition, the elastic member 180 may be fixed to the first housing 161. The elastic member 180 can be fixed to the first housing 161 while being spaced apart from the first housing 161 in the direction parallel with the OA by at least 500 µm.

The elastic member 180 provides a restoring force. That is, the elastic member 180 provides a restoring force corresponding to the movement of the lens barrel 120 relative to the housing 160. In this case, the elastic member 180 may provide a restoring force in the direction opposite to the moving direction of the lens barrel 180. The elastic member 180 may include a spring. The elastic member 180 may include a plate-type spring. The elastic member 180 may have a thickness in the range of about 30 µm to about 150 µm. In addition, the elastic member 180 may include a metallic material. An elastic part 185 may be made of a metallic alloy. The elastic member 180 may include a polymer material. In this case, the elastic part 185 may be made of a polymer material.

Figure 3:
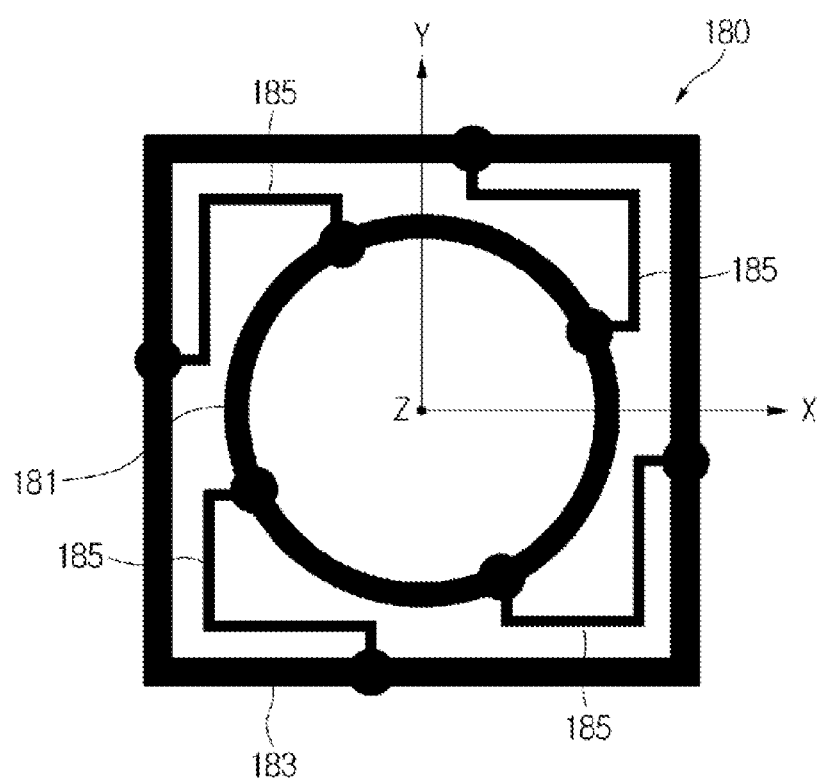
FIG. 3 is a plan view showing an elastic member according to the first embodiment.
Figure 4:
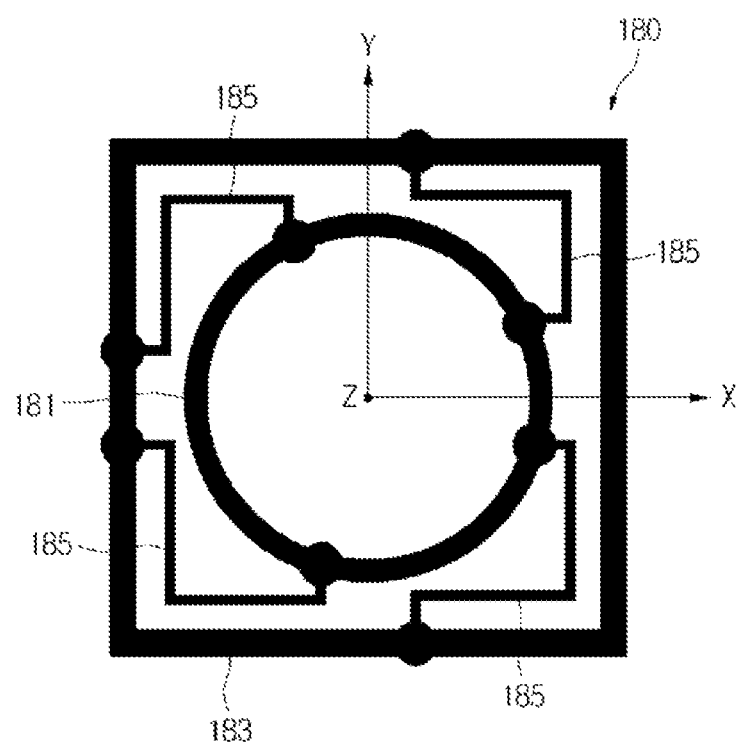
FIG. 4 is a plan view showing the first modification example of the elastic member according to the first embodiment.
Figure 5:
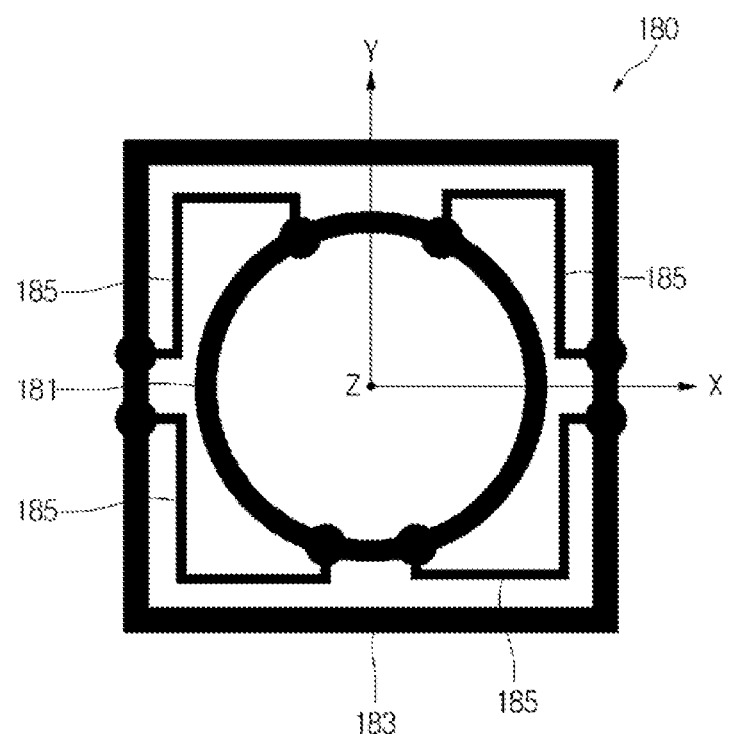
FIG. 5 is a plan view showing the second modification example of the elastic member according to the first embodiment.
Figure 6:
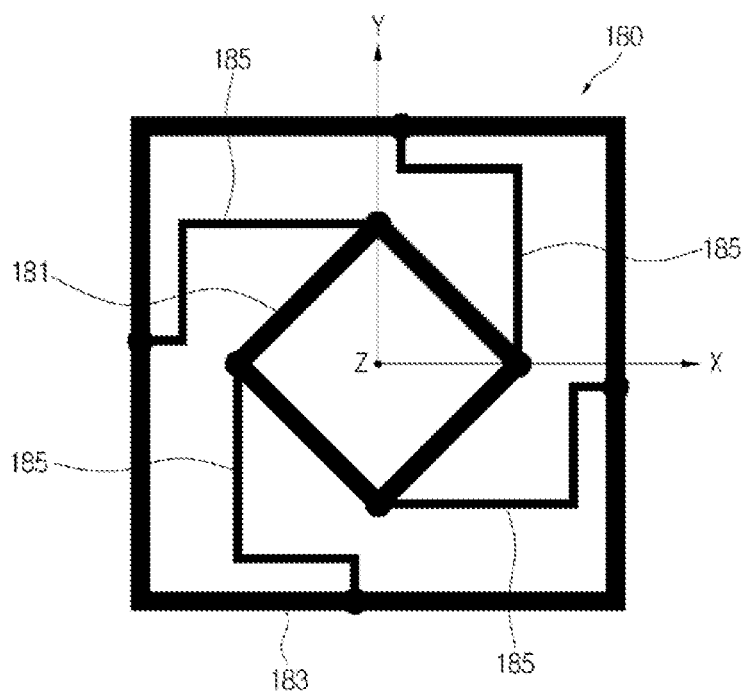
FIG. 6 is a plan view showing the third modification example of the elastic member according to the first embodiment.

FIG. 3 is a plan view showing an elastic member according to the first embodiment. FIG. 4 is a plan view showing the first modification example of the elastic member according to the first embodiment. FIG. 5 is a plan view showing the second modification example of the elastic member according to the first embodiment. FIG. 6 is a plan view showing the third modification example of the elastic member according to the first embodiment.

Referring to FIGS. 3 to 6, the elastic member 180 according to the embodiment includes an inner frame 181, an outer frame 183 and a plurality of elastic parts 185.

The inner frame 181 is disposed at the inmost portion of the elastic member 180. The inner frame 181 may have a closed shape. The inner frame 181 may surround the OA. In this case the inner frame 181 may surround the receiving groove 121. As shown in FIGS. 3, 4 and 5, the inner frame 181 may have a circular shape. As shown in FIG. 6, the inner frame 181 may have a polygonal shape. The inner frame 181 may be fixed to the lens barrel 120.

The outer frame 183 is disposed at the outmost portion of the elastic member 180. The outer frame 183 may have a closed shape. The outer frame 183 may surround the OA. In this case, the outer frame 183 may surround the inner frame 181 at an outside of the inner frame 181. That is, the outer frame 183 may surround the inner frame 181 at the position spaced apart from the inner frame 181. As shown in FIGS. 3 to 6, the outer frame 183 may have a polygonal shape. Although not shown, the outer frame 183 may be disposed on the same plate as that of the inner frame 181. That is, the outer frame 183 may have the same height as that of the inner frame 181 on the plane perpendicular to the OA. The outer frame 183 may be fixed to the housing 160.

The elastic parts 185 connect the inner frame 181 to the outer frame 183. In this case, the elastic parts 185 are disposed between the inner frame 181 and the outer frame 183. The elastic parts 185 are distributed at the same rotation angle about the OA. For example, when the elastic member 180 includes three elastic parts 185, the three elastic parts 185 may be spaced apart from each other at the rotation angle of 120°. Meanwhile, when the elastic member 180 includes four elastic parts 185, the four elastic parts 185 may be spaced apart from each other at the rotation angle of 90°.

In addition, the elastic parts 185 may have the same shape. As shown in FIG. 3, the elastic parts 185 may have the same shape. For example, the elastic parts 185 may have an L-shape on the plane perpendicular to the OA. Further, the elastic parts 185 may be rotated at mutually different angles, respectively, at their positions.

Further, the elastic parts 185 may have mutually different shapes. As shown in FIGS. 4 and 5, the elastic parts 185 may have mutually different shapes. For example, some of the elastic parts 185 may have an L-shape. In addition, some of the elastic parts 185 may be rotated at mutually different angles, respectively, at their positions. The remaining of the elastic parts 185 may have a reverse-L shape. In addition, the remaining of the elastic parts 185 may be rotated at mutually different angles, respectively, at their positions.

For example, as shown in FIG. 4, the elastic parts 185 may have a shape such that the elastic parts 185 are symmetrical to each other about the plane formed by one axis perpendicular to the OA. That is, the elastic parts 185 may have a shape such that the elastic parts 185 are symmetrical to each other about the plane formed by, for example, the Z and X-axes. Of course, the elastic parts 185 may have a shape such that the elastic parts 185 are symmetrical to each other about the plane formed by, for example, the Z and Y-axes.

Meanwhile, as shown in FIG. 5, the elastic parts 185 may be symmetrical to each other about the plane formed by the OA and one axis as well as the plane formed by the OA and the other axis perpendicular to the one axis. That is, the elastic parts 185 may have a shape such that the elastic parts 185 are symmetrical to each other about the plane formed by the Z and Y-axes as well as the plane formed by the Z and X-axes.

Figure 7:
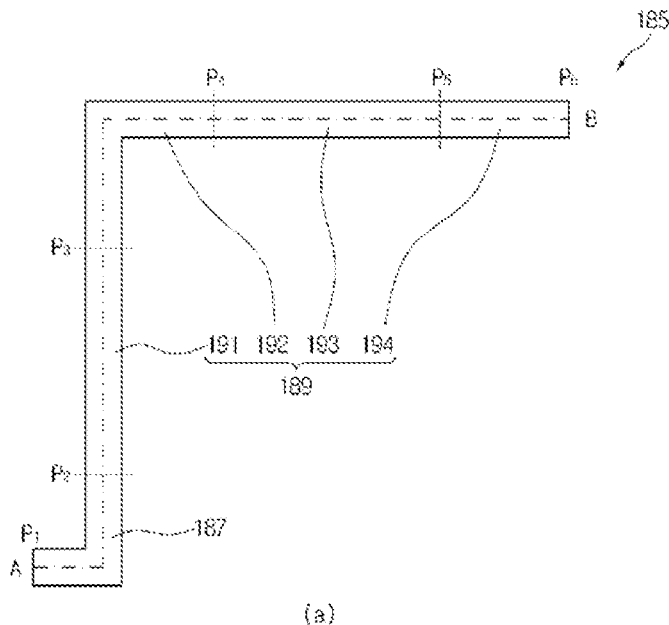
FIG. 7 is a view showing a first example of the elastic part of the elastic member according to the first embodiment.
Figure 7:
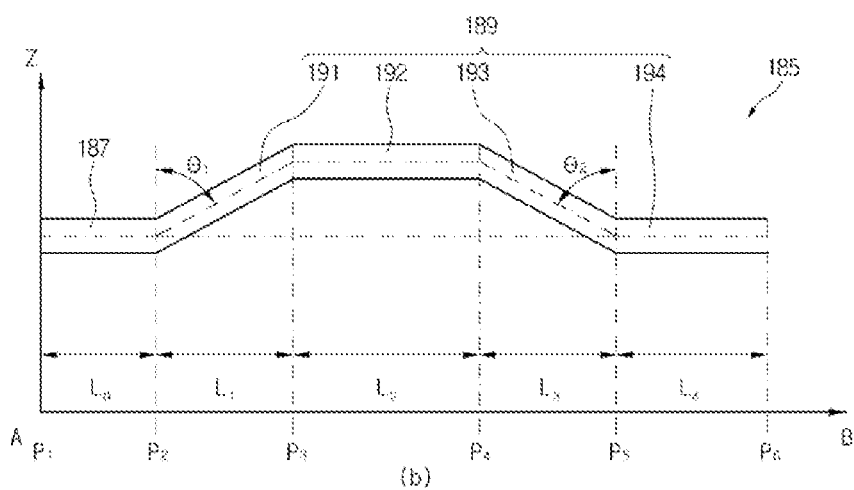

FIG. 7 is a view showing a first example of the elastic part of the elastic member according to the first embodiment. FIG. 7a is a plan view showing the elastic part and FIG. 7b is a sectional view taken along line A-B of FIG. 7a.

Referring to FIG. 7, the elastic part 185 includes first and second elastic parts 187 and 189.

The first elastic part 187 is fixed to the housing 160. The first elastic part 187 is fixed to the outer frame 183. That is, the first elastic part 187 is fixed to the first housing 161 through the outer frame 183.

The second elastic part 189 extends from the first elastic part 187. The second elastic part 189 is fixed to the lens barrel 120. In this case, the second elastic part 189 is fixed to the inner frame 185. That is, the second elastic part 189 is fixed to the lens barrel 120.

The second elastic part 189 includes a group of unit pieces 191, 193, 195 and 197. The group of unit pieces 191, 192, 193 and 194 includes a first unit piece 191, a second unit piece 192, a third unit piece 193 and a fourth unit piece 194. The elastic part 185 is defined by six connecting points $P_1$, $P_2$, $P_3$, $P_4$, $P_5$ and $P_6$. The first to fourth unit pieces 191 to

194 may be sequentially connected to each other at the six connecting points $P_1$, $P_2$, $P_3$, $P_4$, $P_5$ and $P_6$, and may be distinguished from each other based on at least one of a gradient from the OA and a height from the plane perpendicular to the OA.

The first elastic part 187 is connected to the first housing 161 at the first connecting point $P_1$. The first elastic part 187 extends from the first connecting point $P_1$ to the second connecting point $P_2$. The first elastic part 187 has a first length $L_0$ in the direction perpendicular to the OA.

The second elastic part 189 is connected to the first elastic part 187 at the second connecting point $P_2$. The second elastic part 189 extends from the second connecting point $P_2$ to the sixth connecting point $P_6$. The second elastic part 189 is connected to the lens barrel 120 at the sixth connecting point $P_6$. The second elastic part 189 includes a first unit piece 191, a second unit piece 192, a third unit piece 193 and a fourth unit piece 194.

The first unit piece 191 is connected to the second connecting point P2. The first unit piece 191 extends from the second connecting point $P_2$ to the third connecting point $P_3$. The first unit piece 191 extends in the direction inclined at a first gradient $\theta_1$. The first gradient $\theta_1$ may be in the range of about 0° to about 70°. The first unit piece 191 has a first unit length $L_1$ in the direction perpendicular to the OA.

The second unit piece 192 is connected to the first unit piece 191. The second unit piece 192 extends from the third connecting point $P_3$ to the fourth connecting point $P_4$. The second unit piece 192 extends in the direction perpendicular to the OA. The height of the second unit piece 192 from the plane perpendicular to the OA may be different from that of the first elastic part 187. The second unit piece 192 has a second unit length $L_2$ in the direction perpendicular to the OA.

The third unit piece 193 is connected to the second unit piece 192 at the fourth connecting point $P_4$. The third unit piece 193 extends from the fourth connecting point $P_4$ to the fifth connecting point $P_5$. The third unit piece 193 extends in the direction inclined at a second gradient $\theta_2$ from the OA. The second gradient $\theta_2$ may be in the range of about 0° to about −70°. The third unit piece 193 has a third unit length $L_3$ in the direction perpendicular to the OA.

The fourth unit piece 194 is connected to the third unit piece 193 at the fifth connecting point $P_5$. The fourth unit piece 194 extends from the fifth connecting point $P_5$ to the sixth connecting point $P_6$. The fourth unit piece 194 is connected to the lens barrel 120 at the sixth connecting point $P_6$. The fourth unit piece 194 extends in the direction perpendicular to the OA. The height of the fourth unit piece 194 from the plane perpendicular to the OA may be different from that of the first elastic part 187 or the second unit piece 192. In addition, the fourth unit piece 194 has a fourth unit length $L_4$ in the direction perpendicular to the OA.

Figure 8:
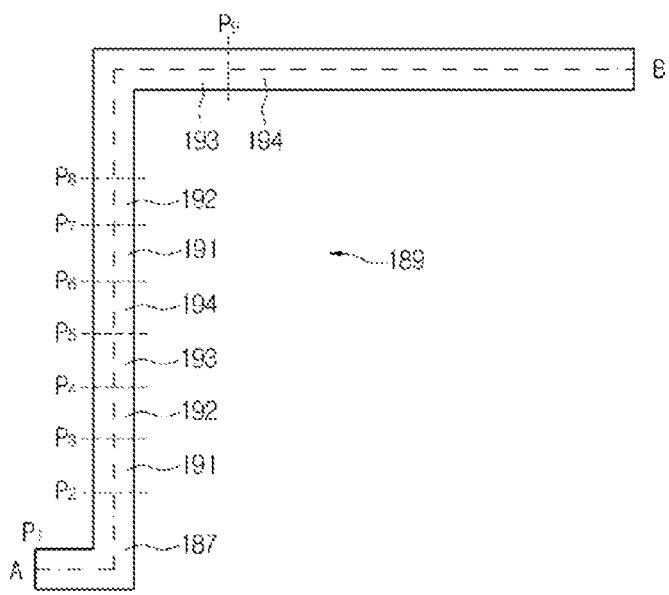
FIG. 8 is a view showing a second example of the elastic part of the elastic member according to the first embodiment.
Figure 8:
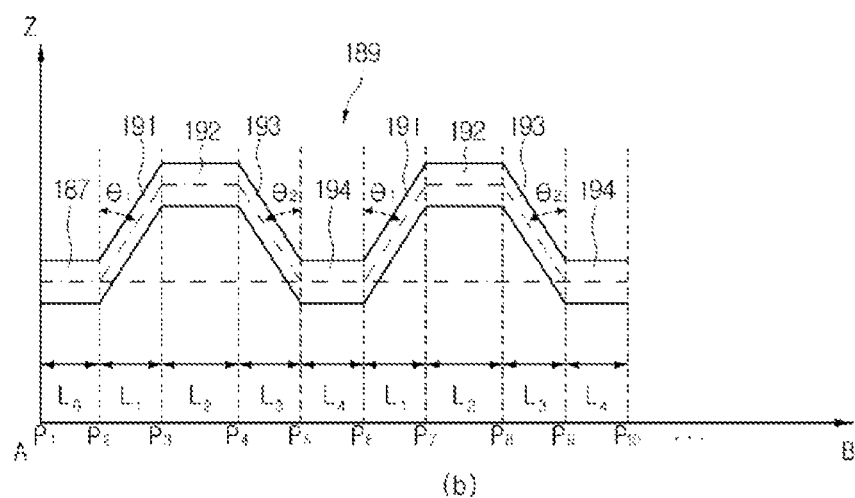

FIG. 8 is a view showing a second example of the elastic part of the elastic member according to the first embodiment. FIG. 8a is a plan view showing the elastic part and FIG. 8b is a sectional view taken along line A-B of FIG. 8a.

Referring to FIG. 8, the elastic part 185 according to the present example includes first and second elastic parts 187 and 189. The second elastic part 189 is formed by connecting at least two groups of unit pieces 191, 192, 193 and 194 to each other. The groups of unit pieces 191, 192, 193 and 194 have the same structure and shape.

In the present embodiment, since each group of the unit pieces 191, 192, 193 and 194 of the first and second elastic parts 187 and 189 is similar to the group described above, the detailed description thereof will be omitted. However, when the second elastic part 189 includes two groups, each of which includes the unit pieces 191 to 194, the elastic part 185 is distinguished by ten connecting points $P_1$, $P_2$, $P_3$, $P_4$, $P_5$, $P_6$, $P_7$, $P_8$, $P_9$ and $P_{10}$.

That is, the first elastic part 187 is connected to the first housing 161 at the first connecting point $P_1$. The first elastic part 187 extends from the first connecting point $P_1$ to the second connecting point $P_2$. The second elastic part 189 is connected to the first elastic part 187 at the second connecting point $P_2$. The second elastic part 189 extends from the second connecting point $P_2$ to the tenth connecting point $P_{10}$. The second elastic part 189 is connected to the lens barrel 120 at the tenth connecting point $P_{10}$.

In the second elastic part 189, the groups of unit pieces 191 to 194 are connected to each other at the sixth connecting point $P_6$. That is, the fourth unit piece 194 of the first group of the unit pieces 191 to 194 is connected to the first unit piece 191 of the second group of unit pieces 191 to 194 at the sixth connecting point $P_6$. In addition, the fourth unit piece 194 of the second group of the unit pieces 191 to 194 is connected to the lens barrel 120 at the tenth connecting point $P_{10}$.

Further, the first and second unit pieces 191 and 192 of the second group of the unit pieces 191 to 194 are connected to each other at the seventh connecting point $P_7$. The second and third unit pieces 192 and 193 are connected to each other at the seventh connecting point $P_8$. The third and fourth unit pieces 193 and 194 are connected to each other at the seventh connecting point $P_9$. In addition, the fourth unit piece 194 is connected to the lens barrel 120 at the tenth connecting point $P_{10}$.

Meanwhile, although the second elastic part 189 of the present example, which includes two groups of unit pieces 191 to 194, is described, the embodiment is not limited thereto. That is, even if the second elastic part 189 includes two groups of unit pieces 191 to 194 or over, the embodiment can be implemented. In this case, the elastic part 185 may be defined by more than ten connecting points $P_1$, $P_2$, $P_3$, $P_4$, $P_5$, $P_6$, $P_7$, $P_8$, $P_9$, $P_{10}$, . . . , and $P_N$.

Figure 9:
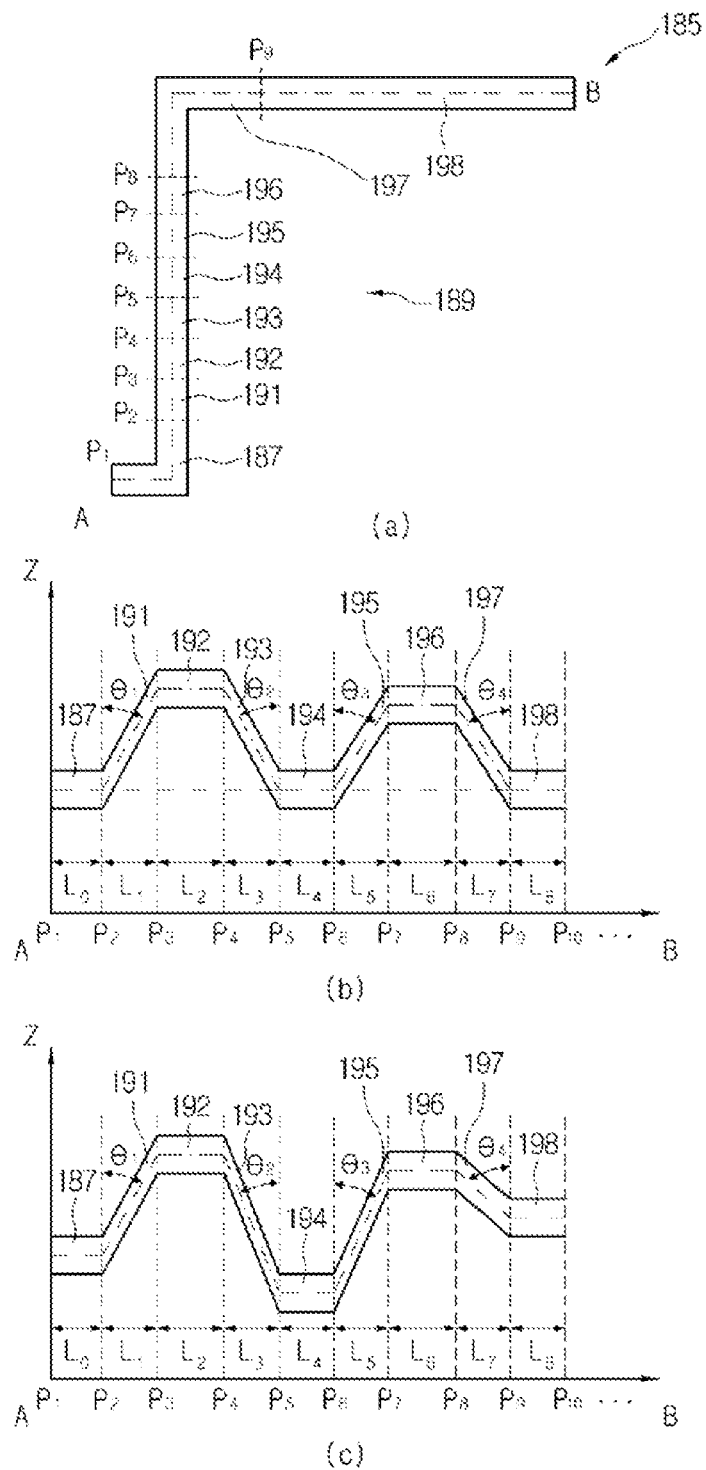
FIG. 9 is a view showing a third example of the elastic part of the elastic member according to the first embodiment.

FIG. 9 is a view showing a third example of the elastic part of the elastic member according to the first embodiment. FIG. 9a is a plan view showing the elastic part and FIGS. 9b, 9c are sectional views taken along line A-B of FIG. 9a.

Referring to FIG. 9, the elastic part 185 according to the present example includes first and second elastic parts 187 and 189. The second elastic part 189 includes a group of unit pieces 191 to 198. The group of unit pieces 191 to 198 includes first to eighth unit pieces 191 to 198. The elastic part 185 is divided by ten connecting points P1 to P10. The first to eighth unit pieces 191 to 198 are sequentially connected to each other at the ten connecting points P1 to P10.

In the present example, since each of the unit pieces 191, 192, 193 and 194 of the first and second elastic parts 187 and 189 is similar to the above, the detailed description will be omitted. Only, the elastic part 185 of the present example further includes the fifth to eighth unit pieces 195 to 198.

That is, the first elastic part 187 is connected to the first housing 161 at the first connecting point P1. The first elastic part 187 extends from the first connecting point P1 to the second connecting point $P_2$. The second elastic part 189 is connected to the first elastic part 187 at the second connecting point $P_2$. The second elastic part 189 extends from the second connecting point $P_2$ to the tenth connecting point $P_{10}$. The second elastic part 189 is connected to the lens barrel 120 at the tenth connecting point $P_{10}$.

The fifth unit piece 195 is connected to the first elastic part 187 at the sixth connecting point $P_6$. The fifth unit piece 195 extends from the sixth connecting point $P_6$ to the seventh connecting point $P_7$. The fifth unit piece 195 extends in the direction inclined at the third gradient $\theta_3$. The third gradient $\theta_3$ is in the range of about 0° to about 70°. The fifth unit piece 195 has a fifth unit length $L_5$ in the direction perpendicular to the OA.

The sixth unit piece 196 is connected to the fifth unit piece 195 at the seventh connecting point $P_7$. The sixth unit piece 196 extends from the seventh connecting point $P_7$ to the eighth connecting point $P_8$. The sixth unit piece 196 extends in the direction perpendicular to the OA. The height of the sixth unit piece 196 from the plane perpendicular to the OA may be different from that of at least one of the first elastic part 187, the second unit piece 192 and the fourth unit piece 194. In addition, the sixth unit piece 196 has a fourth unit length $L_6$ in the direction perpendicular to the OA.

The seventh unit piece 197 is connected to the sixth unit piece 196 at the eighth connecting point $P_8$. The seventh unit piece 197 extends from the eighth connecting point $P_8$ to the ninth connecting point $P_9$. The seventh unit piece 197 extends in the direction inclined at the fourth gradient $\theta_4$. The fourth gradient $\theta_4$ is in the range of about 0° to about −70°. The seventh unit piece 197 has a seventh unit length L, in the direction perpendicular to the OA.

The eighth unit piece 198 is connected to the seventh unit piece 197 at the ninth connecting point $P_9$. The eighth unit piece 198 extends from the ninth connecting point $P_9$ to the tenth connecting point P10. The eighth unit piece 198 is connected to the lens barrel 120 at the tenth connecting point P10. The eighth unit piece 198 extends in the direction perpendicular to the OA. The height of the eighth unit piece 198 from the plane perpendicular to the OA may be different from that of at least one of the first elastic part 187, the second unit piece 192, the fourth unit piece 194 and the sixth unit piece 196. In addition, the eighth unit piece 198 has an eighth unit length $L_8$ in the direction perpendicular to the OA.

Meanwhile, even though the second elastic part 189 is formed by connecting at least two groups of unit pieces 191 to 198 to each other, the embodiment can be implemented. The groups of unit pieces 191 to 198 have the same structure and shape. The elastic part 185 may be defined by more than ten connecting points $P_1$, $P_2$, $P_3$, $P_4$, $P_5$, $P_6$, $P_7$, $P_8$, $P_9$, $P_{10}$, . . . , and $P_N$.

Figure 10:
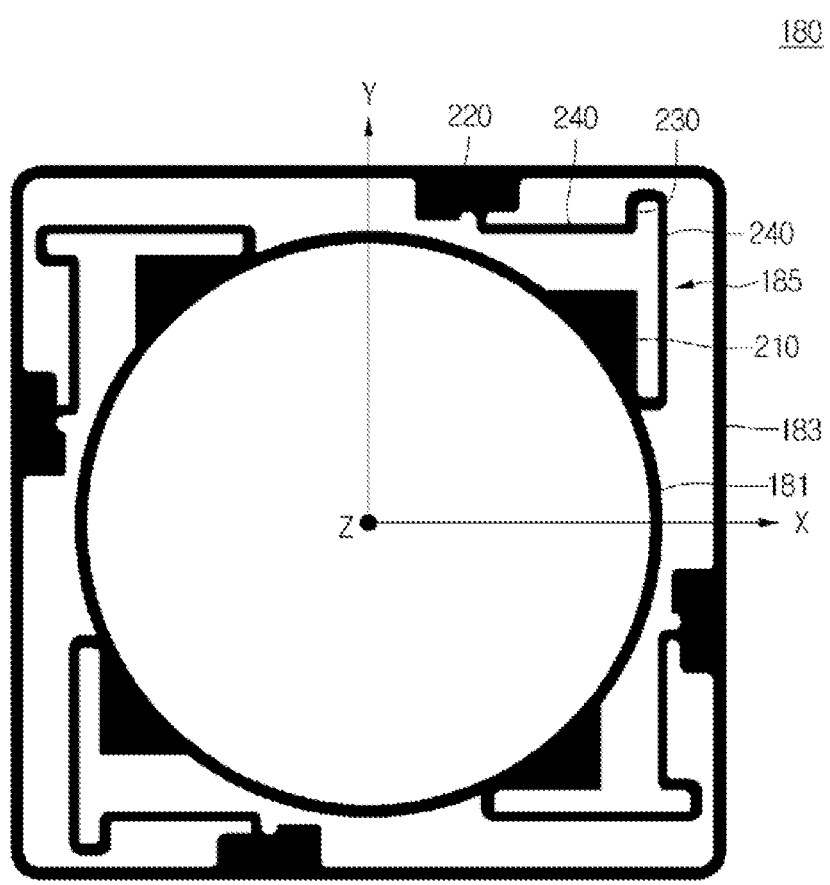
FIG. 10 is a plan view showing an elastic member according to the second embodiment.
Figure 11:
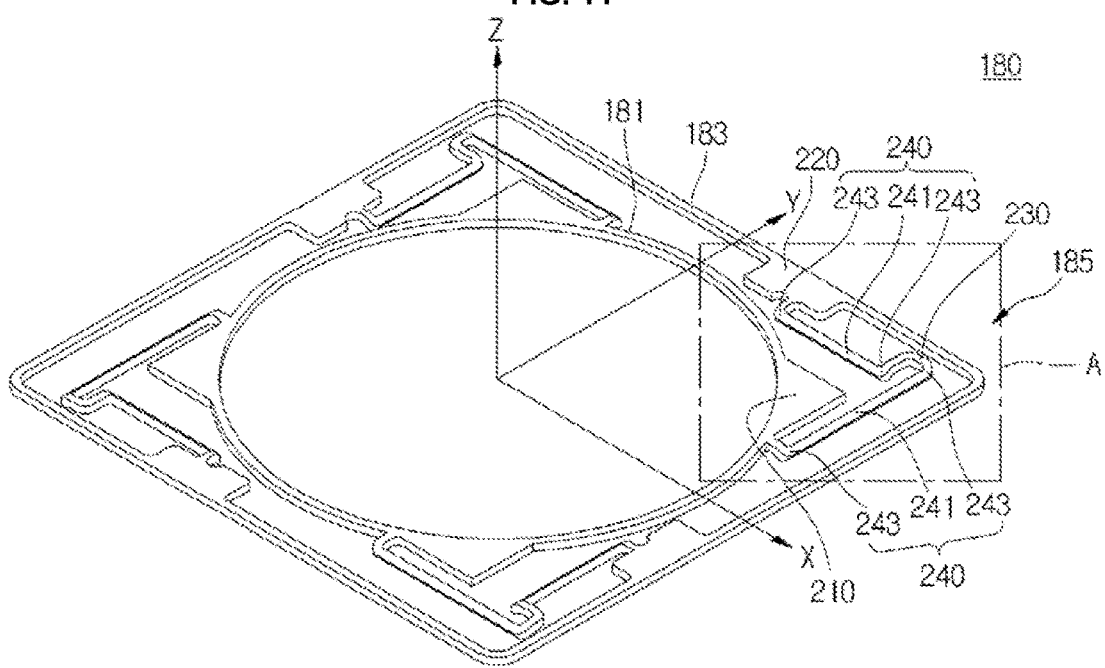
FIG. 11 is a perspective view showing the elastic member according to the second embodiment.
Figure 12:
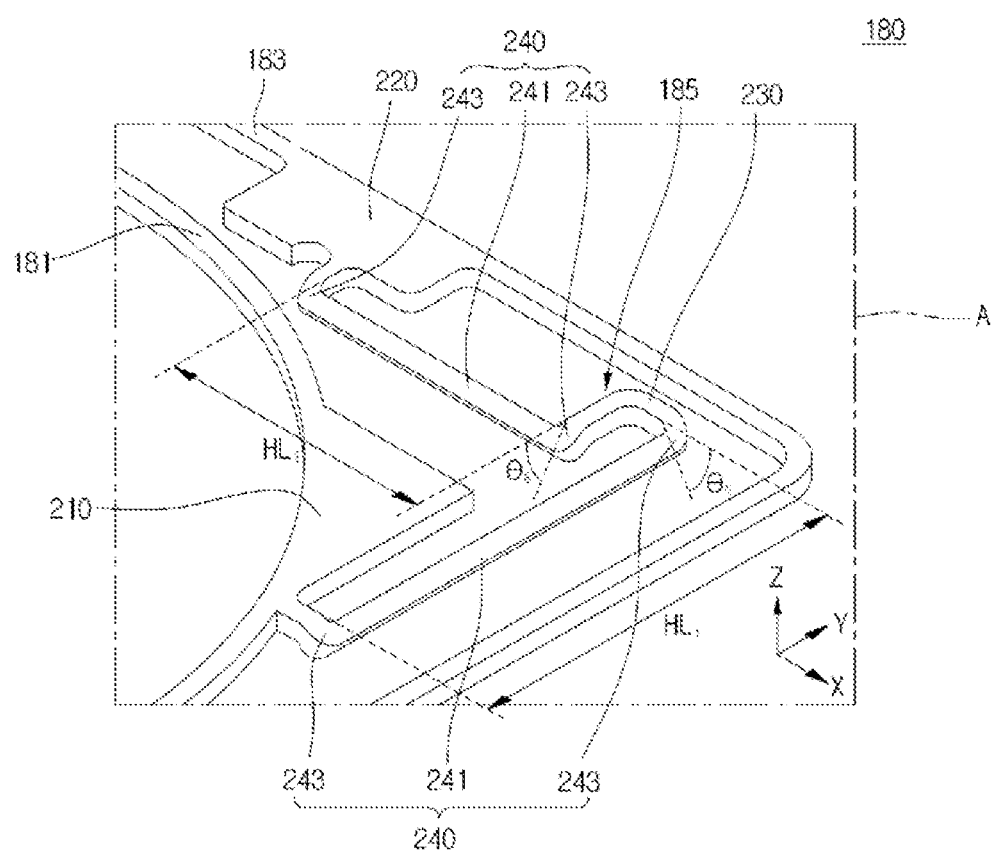
FIG. 12 is an enlarged view of region A in FIG. 11.

FIG. 10 is a plan view showing an elastic member according to the second embodiment. FIG. 11 is a perspective view showing the elastic member according to the second embodiment. FIG. 12 is an enlarged view of region A in FIG. 11.

Referring to FIGS. 10 to 12, the elastic member 180 according to the second embodiment includes an inner frame 181, an outer frame 183 and a plurality of elastic parts 185. Since the configurations of the inner frame 181, the outer frame 183 and the plurality of elastic parts 185 are similar to those described above, the detailed description thereof will be omitted.

However, each elastic part 185 includes an inner side connecting part 210, an outer side connecting part 220, a first elastic part 230 and at least one second elastic part 240. The first elastic part 230 has the same thickness as that of the second elastic part 240. In this case, the second elastic part 240 may be at least 50% of the elastic part 185.

The inner side connecting part 210 is connected to the inner frame 181. In this case, the inner side connecting part 210 is fixed to the inner frame 181. The inner side connecting part 210 may be fixed to the lens barrel 120 through the inner frame 181. The inner side connecting part 210 may be protruded from the inner frame 181 toward the outer frame 181. The inner side connecting part 210 may be disposed on the same plane as the inner frame 181. That is, the inner side connecting part 210 may have the same height as that of the inner frame 181 from the plane perpendicular to the OA.

The outer side connecting part 220 is connected to the outer frame 183. In this case, the outer side connecting part 220 is fixed to the outer frame 183. The outer side connecting part 220 may be fixed to the housing 160 through the outer frame 183. The outer side connecting part 220 may be protruded from the outer frame 183 toward the inner frame 181. The outer side connecting part 220 may be disposed on the same plane as the outer frame 183. That is, the outer side connecting part 220 may have the same height as that of the outer frame 183 from the plane perpendicular to the OA The first elastic part 230 is disposed between the inner and outer frames 181 and 183. The first elastic part 230 may be bent at least one time. The first elastic part 230 is bent and extends on the plane perpendicular to the OA. For example, the first elastic part 230 may extend in the direction parallel with the Y-axis and then, may be bent such that the first elastic part 230 may extend in the direction parallel with the X-axis. Further, the first elastic part 230 may extend in the direction parallel with the X-axis and then, may be bent such that the first elastic part 230 may extend in the direction parallel with the Y-axis.

In this case, the first elastic part 230 may be directly connected to the inner side connecting part 210 or the outer side connecting part 220. That is, the first elastic part 230 may extend from one of the inner and outer side connecting parts 210 and 220. The first elastic part 230 may make contact with the inner side connecting part 210 or the outer side connecting part 220. Also, the first elastic part 230 may extend from one of the inner and outer side connecting parts 210 and 220. The first elastic part 230 may not be directly connected to the inner and outer side connecting parts 210 and 220. That is, the first elastic part 230 may be spaced apart from the inner and outer side connecting parts 210 and 220.

The first elastic part 230 may be disposed on the same plane as at least one of the inner and outer side connecting parts 210 and 220. That is, the first elastic part 230 may have the same height as that of at least one of the inner and outer side connecting parts 210 and 220 from the plane perpendicular to the OA. Here, the first elastic part 230 may have a thickness in the range of about 30 μm to about 150 μm The second elastic part 240 is connected to the first elastic part 230. The second elastic part 240 extends from the first elastic part 230. In this case, the second elastic part 240 may be connected to the inner side connecting part 210. The second elastic part 240 may be connected to the outer side connecting part 220. The second elastic part 240 is formed through a bending from the first elastic part 230. That is, the second elastic part 240 may connect the inner side connecting part 210 and the first elastic part 230 to each other and may be bent from the inner side connecting part 210 and the first elastic part 230. The second elastic part 240 may connect the outer side connecting part 220 and the first elastic part 230 to each other and may be bent from the outer side connecting part 220 and the first elastic part 230.

The second elastic part 240 may be bent at least one time. That is, the second elastic part 240 may be bent and extend on the plane perpendicular to the OA. For example, after the second elastic part 240 extends from the first elastic part 230 and is bent, the second elastic part 240 may extend. Here, the second elastic part 240 may be bent and extend from the first elastic part 230. Further, after the second elastic part 240 extends from the inner or outer side connecting part 210 or 220, the second elastic part 240 may be bent and extend. Here, after the second elastic part 240 is bent from the inner or outer side connecting part 210 or 220, the second elastic part 240 may be bent.

Thus, the second elastic part 240 is disposed on the plane different from that of the first elastic part 230. That is, the second elastic part 240 has a height different from that of the first elastic part 230 from the plane perpendicular to the OA. The second elastic part 240 may have a height higher than that of the first elastic part 230. In this case, the second elastic part 240 has the same thickness as that of the first elastic part 230. The second elastic part 240 may have a thickness in the range of 30 μm to 150 μm A length of the second elastic part 240 may be equal to or longer than that of the first elastic part 230. In this case, the second elastic part 240 may be at least 50% of the elastic part 185.

In addition, the second elastic part 240 includes a horizontal part 241 and a bending part 243. A thickness of the horizontal part 241 is equal to that of the bending part 243.

The horizontal part 241 is disposed in parallel with the plane perpendicular to the OA. That is, the horizontal part 241 has a height from the plane perpendicular to the OA, which is substantially different from that of the first elastic part 230. In this case, the horizontal part 241 may be higher or lower than the first elastic part 230. The horizontal part 241 may have a first horizontal length $HL_1$ between the first elastic part 230 and the inner side connecting part 210. Further, the horizontal part 241 may have a second horizontal length $HL_2$ between the first elastic part 230 and the outer side connecting part 220. In this case, the first horizontal length $HL_1$ is equal to or different from the second horizontal length $HL_2$. In addition, the horizontal part 241 may have a thickness in the range of about 30 μm to about 150 μm The bending part 243 connects the horizontal part 241 to the first elastic part 230. The bending part 243 extends from the horizontal part 241. The bending part 243 is connected to the first elastic part 230. The bending part 243 may connect the inner side connecting part 210 to the horizontal part 241. In this case, the bending part 243 may extend from the horizontal part 241 such that the bending part 243 may be connected to the inner side connecting part 210. In addition, the bending part 243 may connect the outer side connecting part 220 to the horizontal part 241. The bending part 243 may extend from the horizontal part 241 such that the bending part 243 may be connected to the outer side connecting part 220.

In addition, the bending part 243 may be inclined from the first elastic part 230 at a gradient in the range of 30° to 90°. The bending part 243 may be inclined from the first elastic part 230 and between the first elastic part 230 and the inner side connecting part 210 at a fifth gradient $\theta_5$. The bending part 243 may be inclined from the first elastic part 230 and between the first elastic part 230 and the outer side connecting part 220 at a sixth gradient $\theta_6$. The fifth gradient $\theta_5$ may be equal to or different from the sixth gradient $\theta_6$. In addition, the bending part 243 has a thickness equal to that of the horizontal part 241. The thickness of the bending part 243 may be in the range of 30 μm to 150 μm For example, when the elastic part 185 includes a plurality of second elastic parts 240, the second elastic parts 240 may connect the first elastic part 230 and the first elastic part 230 to the inner side connecting part 210 and the outer side connecting part 220, respectively. In this case, the second elastic parts 240 may have the same height from the plane perpendicular to the OA. To the contrary, the second elastic parts 240 may have mutually different heights from the plane perpendicular to the OA.

Meanwhile, although it is disclosed in the embodiment as one example that the elastic part 185 includes one first elastic part 230, the embodiment is not limited thereto. That is, even though the elastic part 185 includes the plurality of first elastic parts 230, the elastic part 185 is applicable to the embodiment. In this case, the first elastic parts 230 are connected to each other through the second elastic part 240. The second elastic part 240 is bent between the first elastic parts 230.

According to the above described embodiments, the elastic part 185 may have elasticity corresponding to up/down, left/right and front/rear directions. In this case, the elastic part 185 may have each elastic modulus corresponding to up/down, left/right and front/rear directions. A ratio of a first elastic modulus corresponding to the up/down direction to a second elastic modulus corresponding to the left/right direction (first elastic modulus/second elastic modulus) may be in the range of 2.0 to 8.0. A ratio of the second elastic modulus corresponding to the left/right direction to the third elastic modulus corresponding to the front/rear direction (second elastic modulus/third elastic modulus) may be in the range of 0.8 to 1.25.

The elastic part 185 may provide a restoring force in the direction opposite to the moving direction of the lens barrel 120 corresponding to the movement of the lens barrel 120. That is, the elastic part 185 may be modified according to at least one of the up/down, left/right and front/rear directions. In this case, the elastic part 185 may provide the restoring force for restoring the elastic part 185 to a previous state. A ratio of a horizontal modification displacement corresponding to the left/right and front/rear directions to the vertical modification displacement corresponding to the up/down direction (horizontal modification displacement/vertical modification displacement) may be less than 0.05.

Meanwhile, although it is disclosed in the embodiment as one example that the camera module 100 includes one elastic member 180, the embodiment is not limited thereto. That is, even though the camera module 100 includes a plurality of elastic members 180, the plurality of elastic members 180 is applicable to the embodiment. The elastic members 180 are stacked in parallel with the OA. The elastic members 180 are spaced apart from each other in parallel with the OA. For example, the gap distance between the elastic members 180 may be about 500 μm or more. The elastic members 180 may have the same shape or mutually different shapes. Further, the elastic members 180 are individually connected to the lens barrel 120 and the housing 160.

In addition, the camera module 100 according to the embodiment may be driven by the following method.

That is, if a shake is sensed in the camera module 100, the driving unit 170 allows the lens barrel 120 to move corresponding to the housing 160. The driving unit 170 may move the lens barrel 120 according to a control signal received through the circuit substrate 150. In this case, the lens barrel 120 may move in at least one of the left/right and front/rear directions according to a voltage applied to the horizontal driving unit 173 of the first driving unit 171. The lens barrel 120 may move in the up/down direction according to a voltage applied to the vertical driving unit 175 of the first driving unit 171. The elastic member 180 provides the restoring force corresponding to the movement of the lens barrel 120. Thus, the shake of the camera module 100 may be compensated.

In addition, the driving unit 170 and the elastic member 180 of the camera module 100 automatically adjust the focus of the lens assembly 120. That is, the driving unit 170 and the elastic member 180 automatically adjust a focal length between the lens assembly 120 and the sensing unit 140. In this case, the vertical driving unit 175 of the first driving unit 171 applies a repulsive force to the second driving unit 177, so that the focal length may be increased. To the contrary, the vertical driving unit 175 of the first driving unit 171 applies an attractive force to the second driving unit 177, so that the focal length may be decreased.

Therefore, the camera module 100 according to the embodiment may automatically correct a shake and may adjust a focus. That is, the driving unit 170 may move the lens barrel 120 corresponding to the housing 160 and the elastic member 180 may provide the restoring force corresponding to the lens barrel 120, so that the camera module 100 may effectively correct the shake and at the same time, may adjust the focus. In addition, since the functions of correcting the shake and adjusting the focus through the driving unit 170 and the elastic member 180 are achieved, the miniaturization of the camera module 100 may be implemented. In other words, since various functions may be achieved without adding many components, the miniaturization of the camera module 100 may be implemented.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
   a housing including a first housing and a second housing disposed under the first housing;
   a lens barrel disposed in the first housing;
   a driving unit including a first driving module and a second driving module, the first driving module disposed between the first housing and the lens barrel and including a first coil and a magnet spaced apart from and facing each other in a first direction perpendicular to an optical axis of the lens barrel, the magnet being coupled to the lens barrel, the second driving module including a second coil disposed on the second housing and the magnet facing the second coil in a second direction parallel to the optical axis of the lens barrel, the first driving module and the second driving module sharing use of the magnet coupled to the lens barrel to move the lens barrel in the first direction and the second direction, respectively;
   a sensor unit disposed under a portion of the second housing,
   wherein the first housing includes four side surfaces,
   wherein the magnet includes four magnets coupled to the lens barrel, each magnet coupled to the lens barrel having a shape of plate and facing one of the four side surfaces of the first housing, respectively,
   wherein the second coil includes four coils, each coil disposed between the second housing and the four magnets, respectively, and wound around an axis parallel with the optical axis of the lens barrel, and
   wherein the first driving module and the second driving module move the lens barrel relative to the sensor unit.

2. The camera module of claim 1, wherein a distance between the second coil and the sensor unit remains constant when the driving unit moves the lens barrel.

3. The camera module of claim 1, further comprising an elastic member connecting the housing and the lens barrel, and including a first elastic part and a second elastic part bent from the first elastic part.

4. The camera module of claim 3, wherein a ratio of a first elastic modulus corresponding to a first axis perpendicular to the optical axis of the lens barrel to a second elastic modulus corresponding to a second axis perpendicular to the optical axis and the first axis in the elastic member is in a range of 0.8 to 1.25.

5. The camera module of claim 3, wherein the second elastic part includes a portion having a thickness equal to a thickness of the first elastic part, and
   wherein the thickness is in a range of 30 µm to 150 µm.

6. The camera module of claim 4, wherein the elastic member further includes:
   an outer frame connected to the housing and the first elastic part; and
   an inner frame connected to the lens barrel and the second elastic part.

7. The camera module of claim 6, wherein the elastic member includes a plurality of elastic parts connecting the outer frame to the inner frame and distributed at a same rotation angle with reference to the optical axis of the lens barrel.

8. The camera module of claim 7, wherein the plurality of elastic parts have structures symmetrical to each other with reference to a plane defined by the optical axis and the first axis.

9. The camera module of claim 7, wherein the plurality of elastic parts have structures symmetrical to each other with reference to a plane defined by the optical axis and the second axis.

10. The camera module of claim 1, further comprising a filter disposed between the lens barrel and the sensor unit.

11. The camera module of claim 1, further comprising a circuit board disposed under the sensor unit and coupled to the second housing.

12. The camera module of claim 11, wherein the first coil and the second coil are electrically connected to the circuit board.

13. The camera module of claim 1, wherein the first driving module is coupled to the first housing and the lens barrel.

14. The camera module of claim 1, wherein the second coil is coupled to an upper surface of the second housing and the magnet moves relative to the second housing.

15. The camera module of claim 1, wherein the driving unit moves the lens barrel with reference to the housing in three-axis directions perpendicular to each other.

16. The camera module of claim 1, wherein an uppermost surface of the second coil is disposed lower than a bottom surface of the magnet.

17. The camera module of claim 1, wherein an uppermost surface of the second coil is disposed lower than a bottom surface of the first coil.

18. The camera module of claim 1, wherein a distance between the second housing and the sensor unit remains constant when the driving unit moves the lens barrel.

19. An information technology device comprising the camera module of claim 1.

\* \* \* \* \*